US012565093B2

(12) United States Patent
Ono et al.

(10) Patent No.: US 12,565,093 B2
(45) Date of Patent: Mar. 3, 2026

(54) INVERTER ARRANGEMENT FOR AN ELECTRIC WORK VEHICLE

(71) Applicant: Kubota Corporation, Osaka (JP)

(72) Inventors: Kohei Ono, Sakai (JP); Makoto Odagiri, Sakai (JP)

(73) Assignee: Kubota Corporation, Osaka (JP)

( * ) Notice: Subject to any disclaimer, the term of this patent is extended or adjusted under 35 U.S.C. 154(b) by 269 days.

(21) Appl. No.: 18/371,598

(22) Filed: Sep. 22, 2023

(65) Prior Publication Data

US 2024/0100931 A1 Mar. 28, 2024

(30) Foreign Application Priority Data

Sep. 26, 2022 (JP) ................................. 2022-152770

(51) Int. Cl.
*B60K 1/04* (2019.01)
*B60K 17/06* (2006.01)
*B60K 17/28* (2006.01)
(52) U.S. Cl.
CPC ............... *B60K 1/04* (2013.01); *B60K 17/06* (2013.01); *B60K 17/28* (2013.01); *B60K 2001/0411* (2013.01); *B60Y 2200/221* (2013.01)

(58) Field of Classification Search
CPC .... B60K 1/04; B60K 17/28; B60Y 2200/221; B60L 50/64; B60L 50/66; B60L 2200/40
See application file for complete search history.

(56) References Cited

U.S. PATENT DOCUMENTS

| | | | | |
|---|---|---|---|---|
| 8,215,692 | B2 * | 7/2012 | Oriet ..................... | B62D 21/14 |
| | | | | 296/26.08 |
| 2007/0125056 | A1 | 6/2007 | Edmond | |
| 2023/0132970 | A1 * | 5/2023 | Hashimoto ............. | B60L 15/20 |
| | | | | 180/65.6 |

FOREIGN PATENT DOCUMENTS

| | | |
|---|---|---|
| JP | 3713480 B2 | 8/2005 |
| JP | 2013141875 A | 7/2013 |
| JP | 20177608 A | 1/2017 |
| JP | 202260665 A | 4/2022 |
| KR | 1020130040286 A | 4/2013 |

* cited by examiner

*Primary Examiner* — Jason D Shanske
*Assistant Examiner* — James J Triggs
(74) *Attorney, Agent, or Firm* — The Webb Law Firm

(57) ABSTRACT

A work vehicle includes a travel device, a battery, a motor configured to supply motive power to the travel device, an inverter configured to operate the motor, and an operation section. The battery is forward of the operation section, and the inverter is between the battery and the operation section in a side view.

4 Claims, 8 Drawing Sheets

INVERTER ARRANGEMENT FOR AN ELECTRIC WORK VEHICLE

CROSS-REFERENCE TO RELATED APPLICATION

This application claims priority to Japanese Patent Application No. 2022-152770 filed Sep. 26, 2022, the disclosure of which is hereby incorporated by reference in its entirety.

BACKGROUND OF THE INVENTION

1. Field of the Invention

The present invention relates to an electric work vehicle in which a motor drives a travel device, and a hybrid work vehicle in which an engine and a motor drive a travel device.

2. Description of Related Art

JP 2013-141875A discloses an example of an electric work vehicle. JP 2013-141875A states that a transmission case that houses a transmission for travel is provided at a rear portion of the work vehicle, and a motor is connected to a front portion of the transmission case. A battery is provided at a portion slightly higher than front wheels (each of which corresponds to travel devices) in a front portion of the work vehicle.

JP 2013-141875A discloses an example of related art.

SUMMARY OF THE INVENTION

In the case of providing an inverter for operating the motor in a work vehicle, there is a demand for compactly providing the inverter in the work vehicle. The present invention aims to configure a work vehicle such that an inverter can be compactly provided in the work vehicle.

A work vehicle of the present invention includes: a travel device; a battery; a motor configured to supply motive power to the travel device; an inverter configured to operate the motor; and an operation section, wherein the battery is forward of the operation section, and the inverter is between the battery and the operation section in a side view.

According to the present invention, the battery is forward of the operation section, the inverter is between the battery and the operation section, and the battery and the inverter are next to each other in the front-back direction. This enables the inverter to be compactly provided in the work vehicle.

According to the present invention, the inverter is near the battery, making it possible to shorten a harness between the inverter and the battery. This can simplify the harness between the inverter and the battery.

In the present invention, it is preferable that the work vehicle further includes: a steering wheel configured to operate the travel device and located at a front portion of the operation section; and a steering shaft configured to operate the travel device and extending downward from the steering wheel, wherein the inverter is between the battery and the steering shaft in a side view.

A work vehicle is often configured such that a steering wheel is at a front portion of the operation section and a steering shaft extends downward from the steering wheel, and travel devices, such as front wheels, are steered by the steering wheel.

According to the present invention, the steering wheel and the steering shaft are rearward of the battery, and the inverter is between the battery and the steering shaft. This allows the inverter to be compactly provided in the work vehicle with effective use of a space between the battery and the steering shaft.

In the present invention, it is preferable that the inverter extends in an up-down direction in a side view and extends in a left-right direction in a plan view.

An inverter is often constituted by a rectangular case housing various devices.

According to the present invention, the inverter extends in the up-down direction in a side view and extends in the left-right direction in a plan view, thereby enabling the inverter to extend along a rear portion of the battery. Thus, the inverter can be close to the rear portion of the battery, which is advantageous in terms of compactly providing the inverter in the work vehicle.

In the present invention, it is preferable that the work vehicle further includes a pillar frame having a left section extending in the up-down direction, a right section extending in the up-down direction, and an upper section extending between an upper portion of the left section and an upper portion of the right section, wherein the pillar frame is between the battery and the operation section in a side view, and the inverter is between the left section and the right section and below the upper section in a front view.

There are cases where a work vehicle is configured such that a pillar frame is forward of the operation section and supports a cover of a hood or the like in a front portion of the work vehicle, a steering wheel, and other components. There are cases where a pillar frame has a right section extending in the up-down direction, a left section extending in the up-down direction, and an upper section extending between an upper portion of the right section and an upper portion of the left section.

According to the present invention, if the pillar frame is between the battery and the operation section, the inverter is between the left section and the right section of the pillar frame, below the upper section of the pillar frame, and inward of the pillar frame. This enables the inverter to be provided with effective use of a region inward of the pillar frame, which is advantageous in terms of compactly providing the inverter in the work vehicle.

In the present invention, it is preferable that the motor is below the inverter.

According to the present invention, the motor is near the inverter, making it possible to shorten a harness between the inverter and the motor. This can simplify the harness between the inverter and the motor. According to the present invention, the motor is below the inverter and at a relatively low position, allowing the work vehicle to have a lower center of gravity. This can improve the traveling stability of the work vehicle.

A work vehicle of the present invention includes: a travel device; a battery; a motor configured to supply motive power to the travel device; an inverter configured to operate the motor; and an operation section, wherein the battery is forward of the operation section, and the inverter is forward of the battery.

According to the present invention, the battery is forward of the operation section, the inverter is forward of the battery, and the battery and the inverter are next to each other in the front-back direction. This enables the inverter to be compactly provided in the work vehicle. According to the present invention, the inverter is near the battery, making it possible to shorten a harness between the inverter and the battery. This can simplify the harness between the inverter and the battery.

According to the present invention, outside air is more likely to hit the inverter while the work vehicle moves forward, which is advantageous in terms of cooling the inverter.

In the present invention, it is preferable that the inverter extends in an up-down direction in a side view and extends in a left-right direction in a plan view.

An inverter is often constituted by a rectangular case housing various devices. According to the present invention, the inverter extends in the up-down direction in a side view and extends in the left-right direction in a plan view, thereby enabling the inverter to extend along a front portion of the battery. Thus, the inverter can be close to the front portion of the battery, which is advantageous in terms of compactly providing the inverter in the work vehicle.

A work vehicle of the present invention includes: a travel device; a battery; a motor; an inverter configured to operate the motor; an operation section including an operator seat; and a transmission case housing a transmission for travel, wherein the motor, the transmission, and the travel device are configured such that motive power from the motor is transmitted to the transmission and transmitted from the transmission to the travel device, the transmission case is below the operator seat in the operation section, and the inverter is between the operator seat and the transmission case in a side view.

In the work vehicle, if the transmission case is below the operator seat in the operation section, a relatively large space is likely to be created between the operator seat and the transmission case. According to the present invention, the inverter can be provided with effective use of the space between the operator seat and the transmission case by providing the inverter between the operator seat and the transmission case. Thus, the inverter can be compactly provided in the work vehicle. According to the present invention, work on the inverter can be easily performed by, for example, removing the operator seat, thus improving the maintainability of the inverter.

In the present invention, it is preferable that the inverter extends in a horizontal direction.

An inverter is often constituted by a rectangular case housing various devices.

According to the present invention, the inverter can be easily provided between the operator seat and the transmission case by providing the inverter in the horizontal direction, which is advantageous in terms of compactly providing the inverter in the work vehicle.

In the present invention, it is preferable that the motor is between the operator seat and the transmission case in a side view.

According to the present invention, the motor is located relatively far rearward from the center of the work vehicle in the front-back direction. This makes it easier for the motor to function as a balance weight while a work device with a relatively large weight is supported by the front portion of the work vehicle. This enables the work vehicle to have a good front-back balance during work travel with a work device having a relatively large weight supported by the front portion of the work vehicle.

According to the invention, the motor can be relatively easily provided with effective use of the space between the operator seat and the transmission case, and the support structure of the motor can be configured relatively easily, thus simplifying the support structure of the motor.

According to the present invention, the motor is near the inverter, making it possible to shorten a harness between the inverter and the motor. This can simplify the harness between the inverter and the motor. According to the present invention, work on the motor can be easily performed by, for example, removing the operator seat, thus improving the maintainability of the motor.

In the present invention, it is preferable that the work vehicle further includes: a work device; a transmission case housing a transmission for travel, an operator seat included in the operation section; a link mechanism disposed on the transmission case, configured to be raised and lowered, and joined to the work device; a hydraulic cylinder disposed on the transmission case and configured to raise and lower the link mechanism; a hydraulic pump configured to supply hydraulic oil to the hydraulic cylinder; and a pump motor configured to drive the hydraulic pump, wherein the motor, the transmission, and the travel device are configured such that motive power from the motor is transmitted to the transmission and transmitted from the transmission to the travel device, the transmission case is below the operator seat, and the pump motor is between the operator seat and the transmission case in a side view.

In a work vehicle, there are cases where a link mechanism is disposed on the transmission case such that the link mechanism can be raised and lowered, and a hydraulic cylinder for raising and lowering the link mechanism and a hydraulic pump for supplying hydraulic oil to the hydraulic cylinder are disposed on the transmission case. With this, the work device can be joined to the link mechanism and raised and lowered by raising and lowering the link mechanism with use of the hydraulic cylinder.

The hydraulic cylinder and the hydraulic pump are provided in the transmission case in order to supply lubricating oil stored in the transmission case as hydraulic oil to the hydraulic pump, then supply the hydraulic oil from the hydraulic pump to the hydraulic cylinder, and return the hydraulic oil from the hydraulic cylinder to the transmission case.

In the work vehicle, if the transmission case is below the operator seat in the operation section, a relatively large space is likely to be created between the operator seat and the transmission case.

According to the present invention, in the case of providing the pump motor for driving the hydraulic pump, the pump motor can be provided relatively easily by effectively using the space between the operator seat and the transmission case. This enables the support structure for the pump motor to be configured relatively easily, and simplification of the support structure for the pump motor can be achieved.

According to the present invention, the pump motor is between the operator seat and the transmission case, and thus the pump motor is near the hydraulic pump. This can simplify the structure for driving the hydraulic pump with use of the pump motor.

According to the present invention, work on the pump motor can be easily performed by, for example, removing the operator seat, thus improving the maintainability of the pump motor.

BRIEF DESCRIPTION OF THE DRAWINGS

The terms Fig., Figs., Figure, and Figures are used interchangeably in the specification to refer to the corresponding figures in the drawings.

DESCRIPTION OF THE INVENTION

FIGS. 1 to 8 show electric tractors, each of which is an example of a work vehicle. In FIGS. 1 to 8, F indicates the forward direction, B indicates the rearward direction, U indicates the upward direction, D indicates the downward direction, R indicates the rightward direction, and L indicates the leftward direction.

Overall Configuration of Tractor

Figure 1:
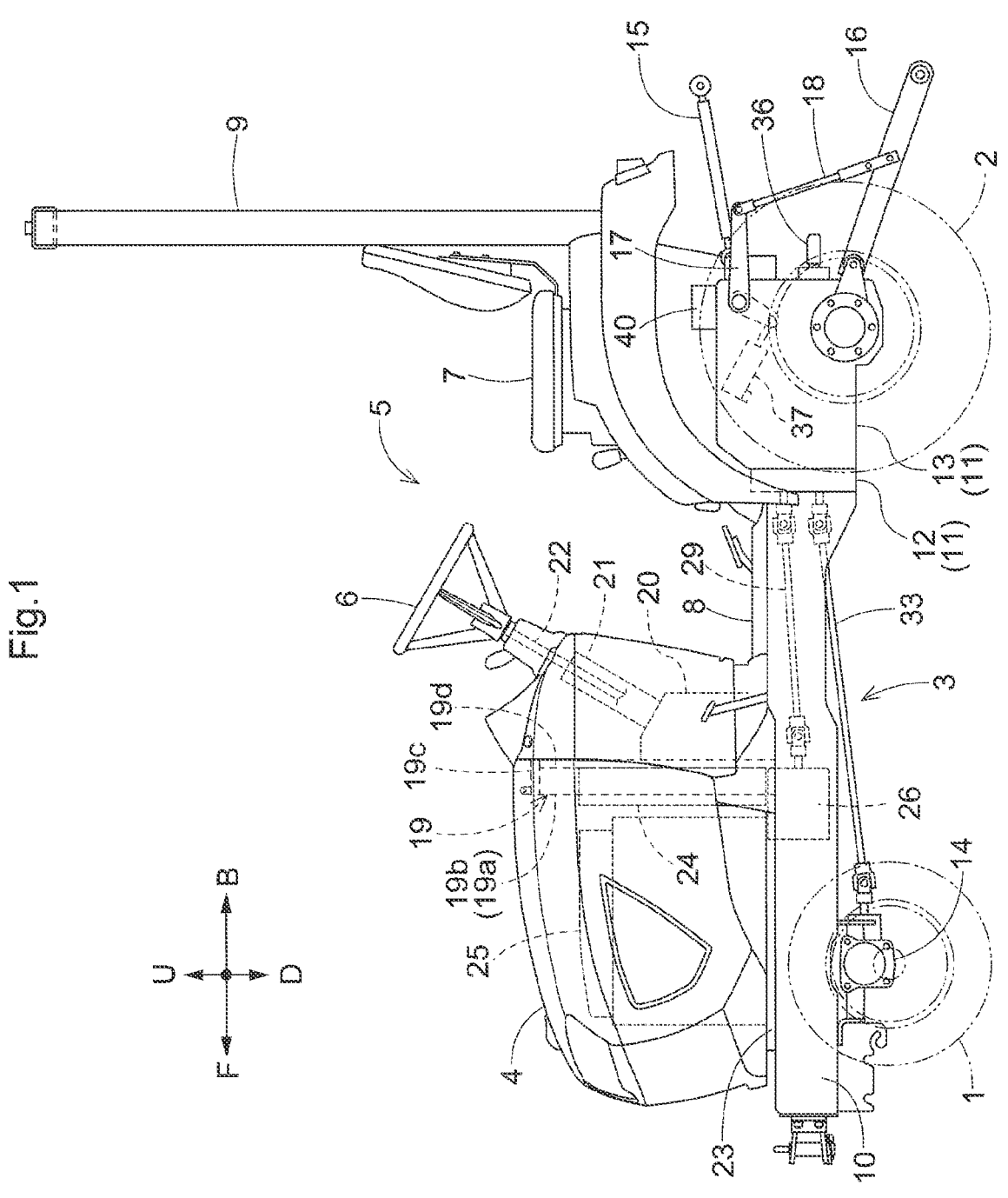
FIG. 1 is a left side view of a tractor.

As shown in FIG. 1, left and right front wheels 1 (each of which corresponds to a front travel device) and left and right rear wheels 2 (each of which corresponds to a rear travel device) support a body 3 of the tractor. A hood 4 is provided at a front portion of the body 3, and an operation section 5 is provided at a rear portion of the body 3. The operation section 5 includes a steering wheel 6 for steering the front wheels 1, an operator seat 7, a floor 8, and a ROPS frame 9.

The body 3 has left and right body frames 10, a transmission case 11, and so on. The transmission case 11 has a front case 12 and a rear case 13 that are joined to each other. The left and right body frames 10 are connected to the transmission case 11 and extend in the front-back direction below the operation section 5 (floor 8). The transmission case 11 is located below the operator seat 7 in the operation section 5.

A front axle case 14 is supported by front portions of the body frames 10, and supports the left and right front wheels 1. The transmission case 11 (rear case 13) supports the left and right rear wheels 2.

A top link 15 (which corresponds to a link mechanism) and left and right lower links 16 (each of which corresponds to a link mechanism) are provided at a rear portion of the transmission case 11 (rear case 13) in such a manner as to be swingable in the up-down direction. The top link 15 and the lower links 16 can be joined to a work device (not shown), such as a rotary cultivator.

Left and right lift arms 17 are provided at the rear portion of the transmission case 11 (rear case 13), and a connecting rod 18 is connected to the lift arms 17 and the lower links 16. The top link 15 and the lower links 16 are raised and lowered and the work device is raised and lowered by swinging the lift arms 17 in the up-down direction.

Configuration of Front Portion of Body

Figure 2:
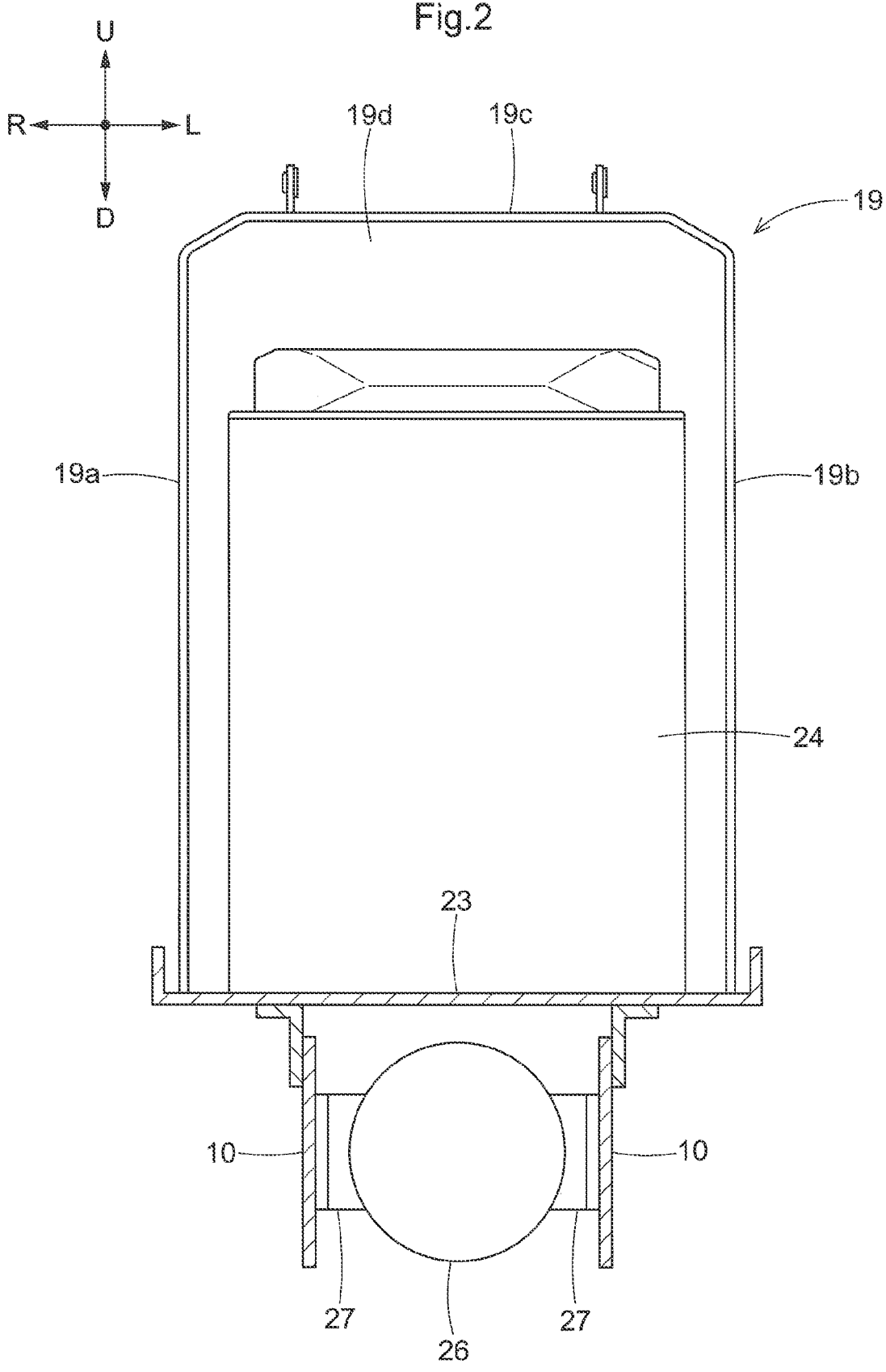
FIG. 2 is a longitudinal front view of a region around an inverter and a motor.

As shown in FIGS. 1 and 2, a pillar frame 19 is provided on the body frames 10 between the front wheels 1 and the operation section 5 (rear wheels 2). The pillar frame 19 is constituted by a folded plate material and has a right section 19a, a left section 19b, an upper section 19c, and a rear section 19d.

The rear section 19d of the pillar frame 19 is flat and extends in the up-down direction and the left-right direction. The right section 19a of the pillar frame 19 is formed by bending forward a right portion of the rear section 19d of the pillar frame 19, and extends in the up-down direction and the front-back direction. The left section 19b of the pillar frame 19 is formed by bending forward a left portion of the rear section 19d of the pillar frame 19, and extends in the up-down direction and the front-back direction.

The upper section 19c of the pillar frame 19 is formed by bending forward an upper portion of the rear section 19d of the pillar frame 19, and extends in the left-right direction and the front-back direction. The upper section 19c of the pillar frame 19 extends between upper portions of the right section 19a and the left section 19b of the pillar frame 19.

As shown in FIG. 1, the hood 4 is supported such that the hood 4 is openable and closable about a fulcrum in the left-right direction of the upper section 19c of the pillar frame 19, and can be operated from a closed position shown in FIG. 1 to an open position above the closed position.

A power steering mechanism 20 is provided below a rear face portion of the rear section 19d of the pillar frame 19. A steering post 21 is attached to the power steering mechanism 20 and extends upward from the power steering mechanism 20. A steering wheel 6 is supported by an upper portion of the steering post 21, and a steering shaft 22 is connected to the steering wheel 6 and the power steering mechanism 20.

In response to the steering wheel 6 being rotated, the rotation of the steering wheel 6 is transmitted to the power steering mechanism 20 via the steering shaft 22, and the power steering mechanism 20 steers the front wheels 1 to the left and right.

With the above configuration, the steering wheel 6 for operating the front wheels 1 (front travel devices) is provided at a front portion of the operation section 5, and the steering shaft 22 for operating the front wheels 1 (front travel devices) extends downward from the steering wheel 6, as shown in FIG. 1.

Configuration Related to Battery and Inverter

A support platform 23 is attached to front upper portions of the left and right body frames 10, as shown in FIGS. 1 and 2. An inverter 24, which is provided on the support platform 23, has a rectangular case with a small dimension (dimension in the front-back direction) that houses various types of equipment.

The inverter 24 extends in the up-down direction in a side view and extends in the left-right direction in a plan view (front view), and is attached to a rear portion of the support platform 23 so as to be in contact with a front face portion of the rear section 19d of the pillar frame 19.

As shown in FIG. 1, the tractor has a battery 25, which is constituted by multiple pairs of stacks (not shown) of connected battery modules (not shown) that are housed in a rectangular-parallelepiped case. The battery 25 is attached to the support platform 23, and the hood 4 at the closed position covers the inverter 24 and the battery 25. Maintenance work for the inverter 24 and the battery 25 can be performed by opening the hood 4.

With the above configuration, the inverter 24 is provided between the right section 19a and the left section 19b of the pillar frame 19 in a front view and overlaps the right section 19a and the left section 19b of the pillar frame 19 in a side view, as shown in FIGS. 1 and 2. The inverter 24 is provided below the upper section 19c of the pillar frame 19 in a front view and overlaps the upper section 19c of the pillar frame 19 in a plan view.

The battery 25 is provided forward of the operation section 5, and the inverter 24 is provided between the battery 25 and the operation section 5 in a side view. The inverter 24 is provided between the battery 25 and the steering shaft 22 in a side view.

The pillar frame 19 is provided between the battery 25 and the operation section 5 in a side view, and the inverter 24 is provided between the battery 25 and the rear section 19*d* of the pillar frame 19 in a side view.

Configuration Related to Motor

Left and right mounting brackets 27 are joined to inner faces of the left and right body frames 10, and left and right portions of a motor 26 are joined to the left and right mounting brackets 27, as shown in FIGS. 1 and 2.

Figure 3:
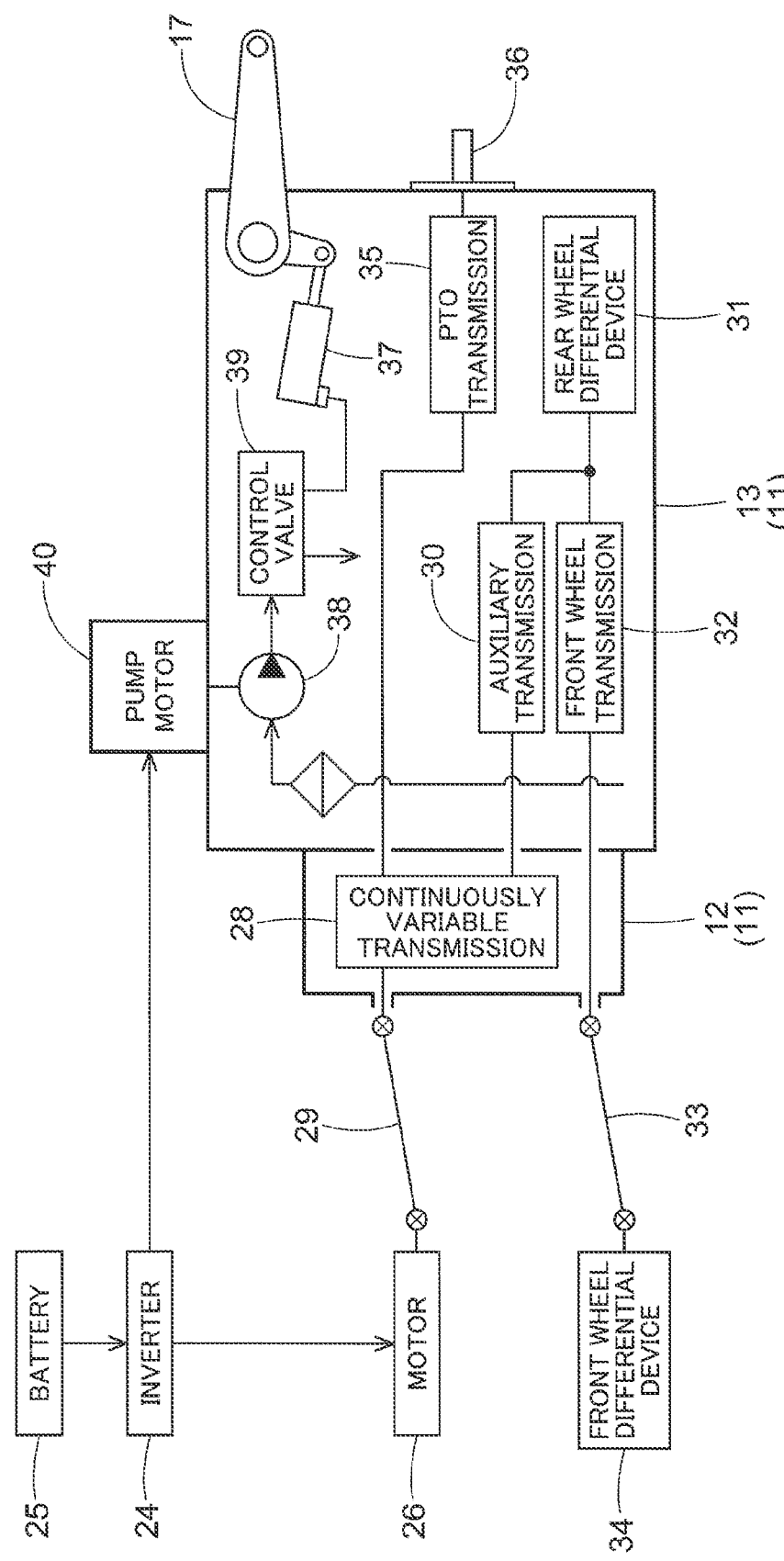
FIG. 3 schematically shows a system for transmission from the motor to front and rear wheels.

The inverter 24 converts DC power from the battery 25 to AC power and supplies the AC power to the motor 26 to operate the motor 26. Motive power from the motor 26 is supplied to the front wheels 1 and the rear wheels 2, as shown in FIG. 3.

With the above configuration, the motor 26 is provided between the front wheels 1 (front travel devices) and the rear wheels 2 (rear travel devices) and below the steering wheel 6 in a side view, as shown in FIGS. 1 and 2.

The left body frame 10 and the right body frame 10 are disposed in the front-back direction below the operation section 5 (floor 8), and the motor 26 is provided between the left body frame 10 and the right body frame 10 in a plan view (front view).

The motor 26 is provided below the pillar frame 19, the power steering mechanism 20, the inverter 24, and the rear portion of the battery 25 in a side view. The pillar frame 19, the power steeling mechanism 20, and the inverter 24 are provided above the motor 26 in a side view.

Configuration of System for Transmission to Front Wheels and Rear Wheels

A hydrostatic continuously variable transmission 28 (which corresponds to a transmission for travel) is housed within the front case 12 of the transmission case 11, and motive power from the motor 26 is transmitted via a transmission shaft 29 to the continuously variable transmission 28, as shown in FIGS. 1 and 3. The continuously variable transmission 28 is capable of steplessly changing forward and backward and is operated by a gearshift pedal (not shown) on the floor 8 of the operation section 5.

An auxiliary transmission 30 (which corresponds to a transmission for travel), a rear wheel differential device 31, and a front wheel transmission 32 (which corresponds to a transmission for travel) are housed within the rear case 13 of the transmission case 11. Motive power subjected to speed change by the continuously variable transmission 28 is transmitted to the auxiliary transmission 30, and is then transmitted from the auxiliary transmission 30 to the rear wheels 2 via the rear wheel differential device 31.

Motive power diverted from between the auxiliary transmission 30 and the rear wheel differential device 31 is transmitted to the front wheel transmission 32, then transmitted from the front wheel transmission 32 via the transmission shaft 33 to the front wheel differential device 34 housed within the front axle case 14, and is transmitted from the front wheel differential device 34 to the front wheels 1.

The front wheel transmission 32 drives the front wheels 1 and the rear wheels 2 at the same speed while the front wheels 1 are operated within the range of left and right set angles from a straight-ahead position. The front wheel transmission 32 drives the front wheels 1 at a higher speed than the rear wheels 2 while the front wheels 1 are steered leftward or rightward beyond the left and light setting angles.

With the above configuration, the tractor has the transmission case 11 (front case 12 and rear case 13) that houses the continuously variable transmission 28 (transmission for travel), the auxiliary transmission 30 (transmission for travel), and the front wheel transmission 32 (transmission for travel), as shown in FIG. 3.

Motive power from the motor 26 is transmitted via the transmission shaft 29 to the continuously variable transmission 28 (transmission for travel), the auxiliary transmission 30 (transmission for travel), and the front wheel transmission 32 (transmission for travel), and is then transmitted from the continuously variable transmission 28 (transmission for travel), the auxiliary transmission 30 (transmission for travel), and the front wheel transmission 32 (transmission for travel) to the front wheels 1 (travel devices) and the rear wheels 2 (travel devices).

Configuration of System for Transmission to Work Device Joined to Top Link and Lower Links A PTO transmission 35 is housed within the rear case 13 of the transmission case 11, and a PTO shaft 36 is provided at a rear portion of the rear case 13 of the transmission case 11, as shown in FIGS. 1 and 3. A transmission shaft (not shown) is connected to the PTO shaft 36 and the work device in response to the work device being joined to the top link 15 and the lower links 16.

While motive power from the motor 26 is transmitted to the continuously variable transmission 28 via the transmission shaft 29, motive power from the transmission shaft 29 (motive power that is not subjected to speed change by the continuously variable transmission 28) is transmitted to the PTO transmission 35, and motive power subjected to speed change by the PTO transmission 35 is transmitted to the PTO shaft 36 and then transmitted from the PTO shaft 36 to the work device.

Configuration Related to Lifting Operation of Lift Arm

A single-acting hydraulic cylinder 37 is provided above the rear portion of the transmission case 11 (rear case 13), and the hydraulic cylinder 37 raises and lowers the lift arm 17, as shown in FIG. 3.

A hydraulic pump 38 and a control valve 39 are provided within the rear portion of the transmission case 11 (rear case 13). Lubricating oil that serves as hydraulic oil and stored in the transmission case 11 (rear case 13) is supplied to the hydraulic pump 38, and is then supplied from the hydraulic pump 38 to the control valve 39.

A pump motor 40 is provided above the rear portion of the transmission case 11 (rear case 13) and drives the hydraulic pump 38. The inverter 24 converts DC power from the battery 25 to AC power and supplies the AC power to the pump motor to operate the pump motor 40.

Operations to supply and discharge the hydraulic oil to and from the hydraulic cylinder 37 are performed from the control valve 39, and the hydraulic cylinder 37 raises and lowers the lift arm 17. The hydraulic oil discharged from the hydraulic cylinder 37 is returned from control valve 39 to the transmission case 11 (rear case 13).

With the above configuration, the hydraulic cylinder 37, which raises and lowers the top link 15 (link mechanism) and the lower links 16 (link mechanism) to which the work device is joined, and the hydraulic pump 38, which supplies the hydraulic oil to the hydraulic cylinder 37, are provided in the transmission case 11 (rear case 13), as shown in FIGS. 1 and 3.

The pump motor 40, which drives the hydraulic pump 38, is located between the operator seat 7 in the operation section 5 and the transmission case 11 (rear case 13) in a side view.

First Variation of Implementation of the Invention

In the configuration shown in FIGS. 1 and 2, the motor 26 may be joined to the support platform 23 and supported by the body 3. The motor 26 may be joined to the pillar frame 19 and supported by the body 3.

Figure 7:
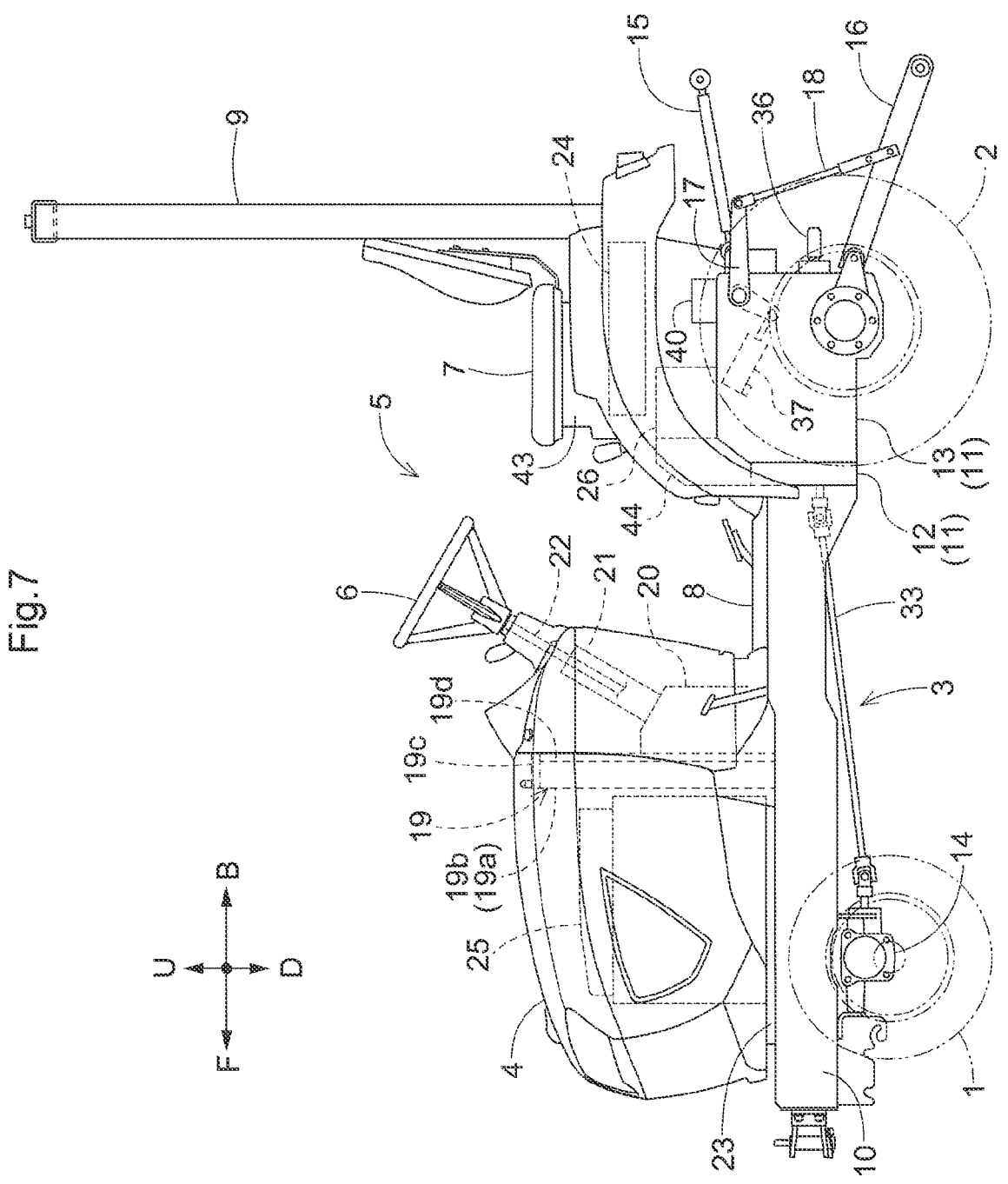
FIG. 7 is a left side view of the tractor according to the fifth variation of implementation of the present invention.

In the configuration shown in FIGS. 1 and 2, the inverter 24 may be joined to the pillar frame 19 and supported by the body 3. The inverter 24 may be provided between the operator seat 7 in the operation section 5 and the transmission case 11 (front case 12 and rear case 13) in a side view, as shown in FIG. 7, which will be described later.

Second Variation of Implementation of the Invention

Figure 4:
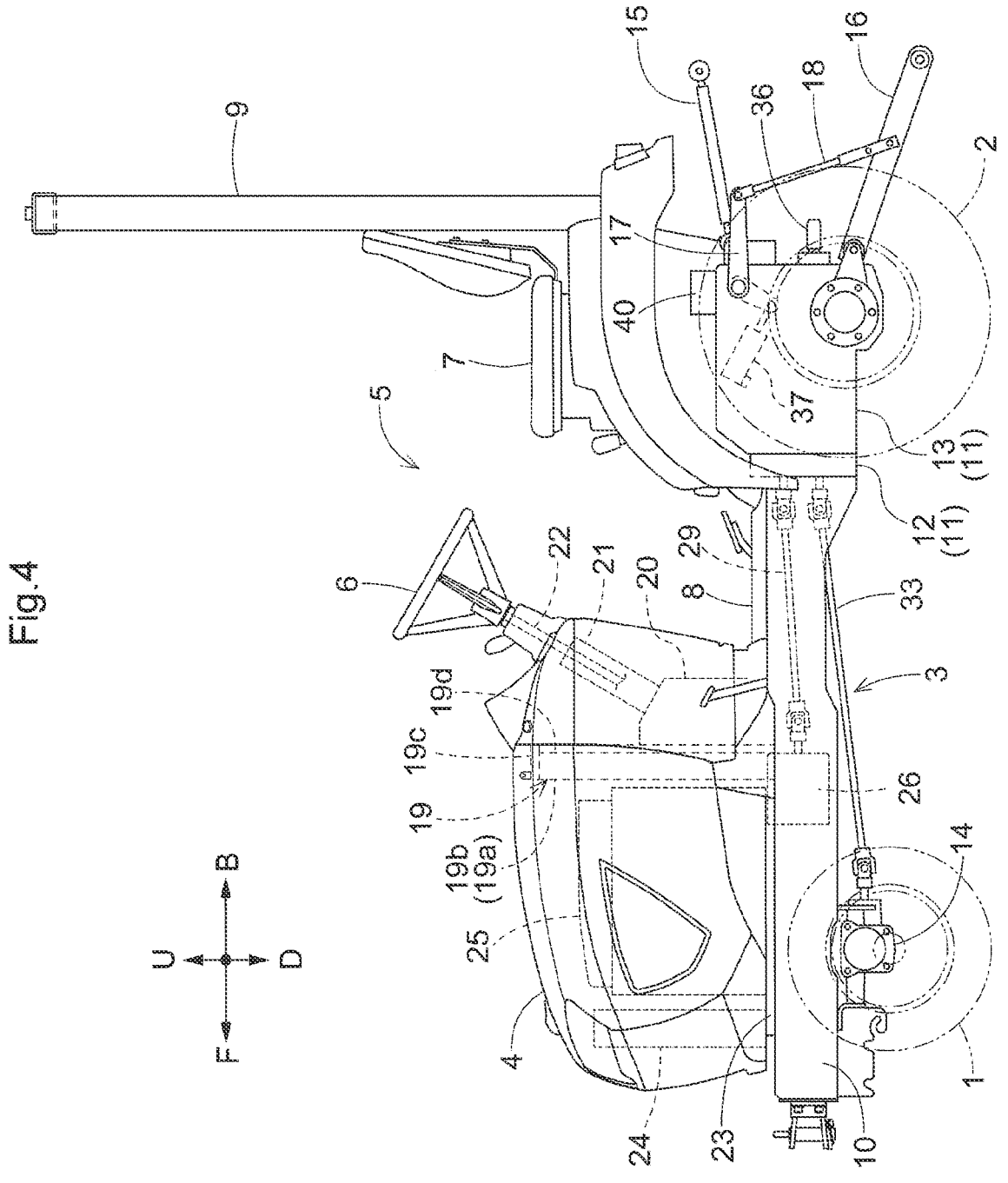
FIG. 4 is a left side view of a tractor according to a second variation of implementation of the present invention.

If the battery 25 is provided forward of the operation section 5 as shown in FIG. 4, the inverter 24 may be provided forward of the battery 25.

According to the configuration shown in FIG. 4, the inverter 24 extends in the up-down direction in a side view and extends in the left-right direction in a plan view (front view), and is provided between a front portion of the hood 4 and a front portion of the battery 25.

Third Variation of Implementation of the Invention

Figure 5:
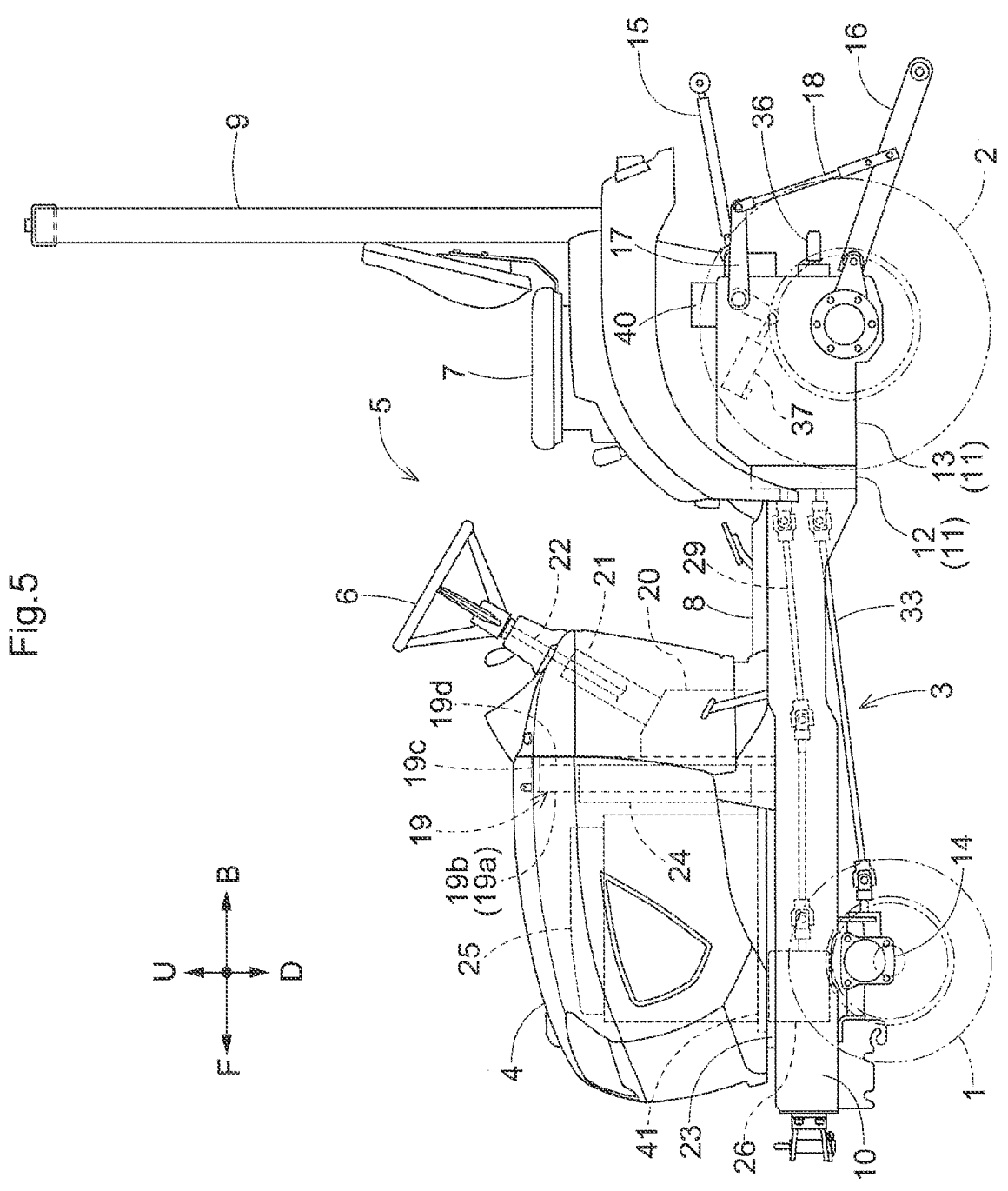
FIG. 5 is a left side view of a tractor according to a third variation of implementation of the present invention.

The motor 26 may be provided above the front axle case 14 (front wheels 1 (front travel devices)) in a side view, as shown in FIG. 5.

According to the configuration shown in FIG. 5, the motor 26 is provided below the front portion of the battery 25, and the position of the motor 26 is slightly higher. Thus, another support platform 41 need only be provided to the support platform 23 such that the battery 25 is attached to the support platform 41 to make the position of the battery 25 slightly higher.

In the configuration shown in FIG. 5, the motor 26 may be joined to the support platform 41 and supported by the body 3. The inverter 24 may be provided forward of the battery 25, as shown in FIG. 4. The inverter 24 may be provided between the operator seat 7 in the operation section 5 and the transmission case 11 (front case 12 and rear case 13) in a side view, as shown in FIG. 7, which will be described later.

Fourth Variation of Implementation of the Invention

Figure 6:
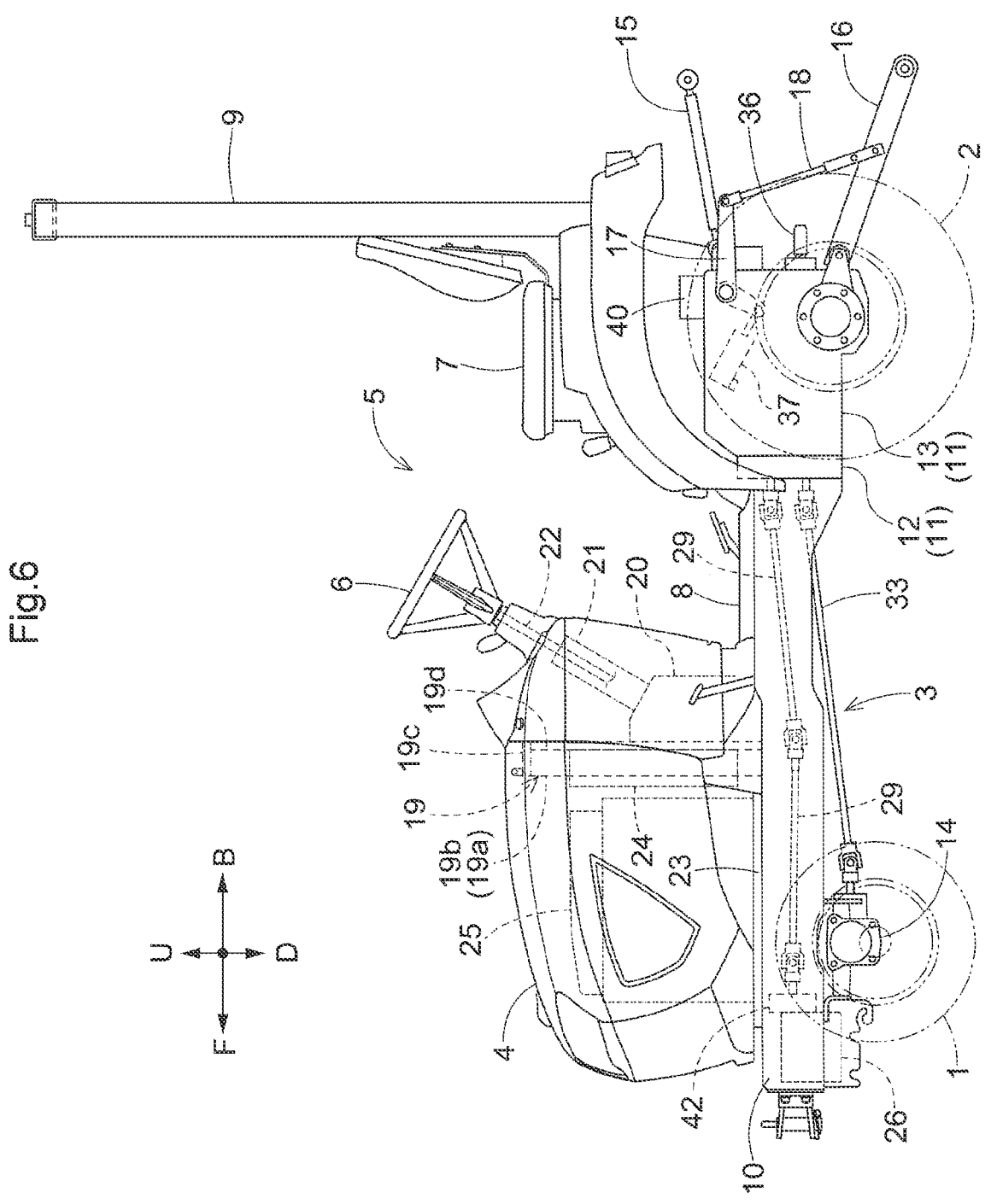
FIG. 6 is a left side view of a tractor according to a fourth variation of implementation of the present invention.

The motor 26 may be provided forward of the front axle case 14 (front wheels 1 (front travel devices)) in a side view, as shown in FIG. 6.

According to the configuration shown in FIG. 6, the motor 26 is located at a lower position. Thus, a transmission mechanism 42 of a gear transmission type need only be attached to a portion of an output shaft (not shown) of the motor 26 in such a manner as to extend upward from the motor 26. The transmission shaft 29 need only be connected to an output shaft (not shown) at an upper portion of the transmission mechanism 42 and the continuously variable transmission 28 (see FIG. 3) such that the transmission shaft 29 extends in the front-back direction above the front axle case 14.

Motive power from the output shaft of the motor 26 is transmitted to the transmission mechanism 42, then transmitted the output shaft at the upper portion of transmission mechanism 42 to the continuously variable transmission 28 (see FIG. 3) via the transmission shaft 29, and is transmitted to the front wheels 1 and the rear wheels 2.

In the configuration shown in FIG. 6, the motor 26 may be joined to the support platform 23 and supported by the body 3. The inverter 24 may be provided forward of the battery 25, as shown in FIG. 4. The inverter 24 may be provided between the operator seat 7 in the operation section 5 and the transmission case 11 (front case 12 and rear case 13) in a side view, as shown in FIG. 7, which will be described later.

Fifth Variation of Implementation of the Invention

As shown in FIG. 7, if the transmission case 11 (front case 12 and rear case 13) is provided below the operator seat 7 in the operation section 5, the motor 26 may be attached to the upper portion of the transmission case 11 (front case 12 and rear case 13) and provided between the operator seat 7 in the operation section 5 and the transmission case 11 (front case 12 and rear case 13) in a side view.

The inverter 24 may be provided between the operator seat 7 in the operation section 5 and the transmission case 11 (front case 12 and rear case 13) in a side view by attaching the inverter 24 to a support frame 43 that is provided in the operation section 5 to support the operator seat 7.

In the configuration shown in FIG. 7, the motor 26 need only be attached to the upper portion of the transmission case 11 (front case 12 and rear case 13) such that an output shaft (not shown) of the motor 26 faces forward, and a transmission mechanism 44 of a gear transmission type need only be attached to the output shaft of the motor 26 and a forward-facing input shaft (not shown) of the continuously variable transmission 28 (see FIG. 3).

Motive power from the output shaft of the motor 26 is transmitted to the transmission mechanism 44, then transmitted from an output shaft (not shown) at a lower portion of the transmission mechanism 44 to the continuously variable transmission 28 (see FIG. 3), and is transmitted to the front wheels 1 and the rear wheels 2.

In the configuration shown in FIG. 7, the inverter 24 is supported in a suspended manner by a lower portion of the support frame 43 and extends in the horizontal direction. The inverter 24 is disposed at a position upward of and away from the motor 26 and the pump motor 40, and is disposed at a position upward of and away from the upper portion of the transmission case 11 (front case 12 and rear case 13).

Sixth Variation of Implementation of the Invention

If the motor 26 is provided between the operator seat 7 in the operation section 5 and the transmission case 11 (front case 12 and rear case 13) in a side view, as shown in FIG. 7, the inverter 24 may be provided rearward of the battery 25, as shown in FIG. 1. The inverter 24 may be provided forward of the battery 25, as shown in FIG. 4.

Seventh Variation of Implementation of the Invention

Figure 8:
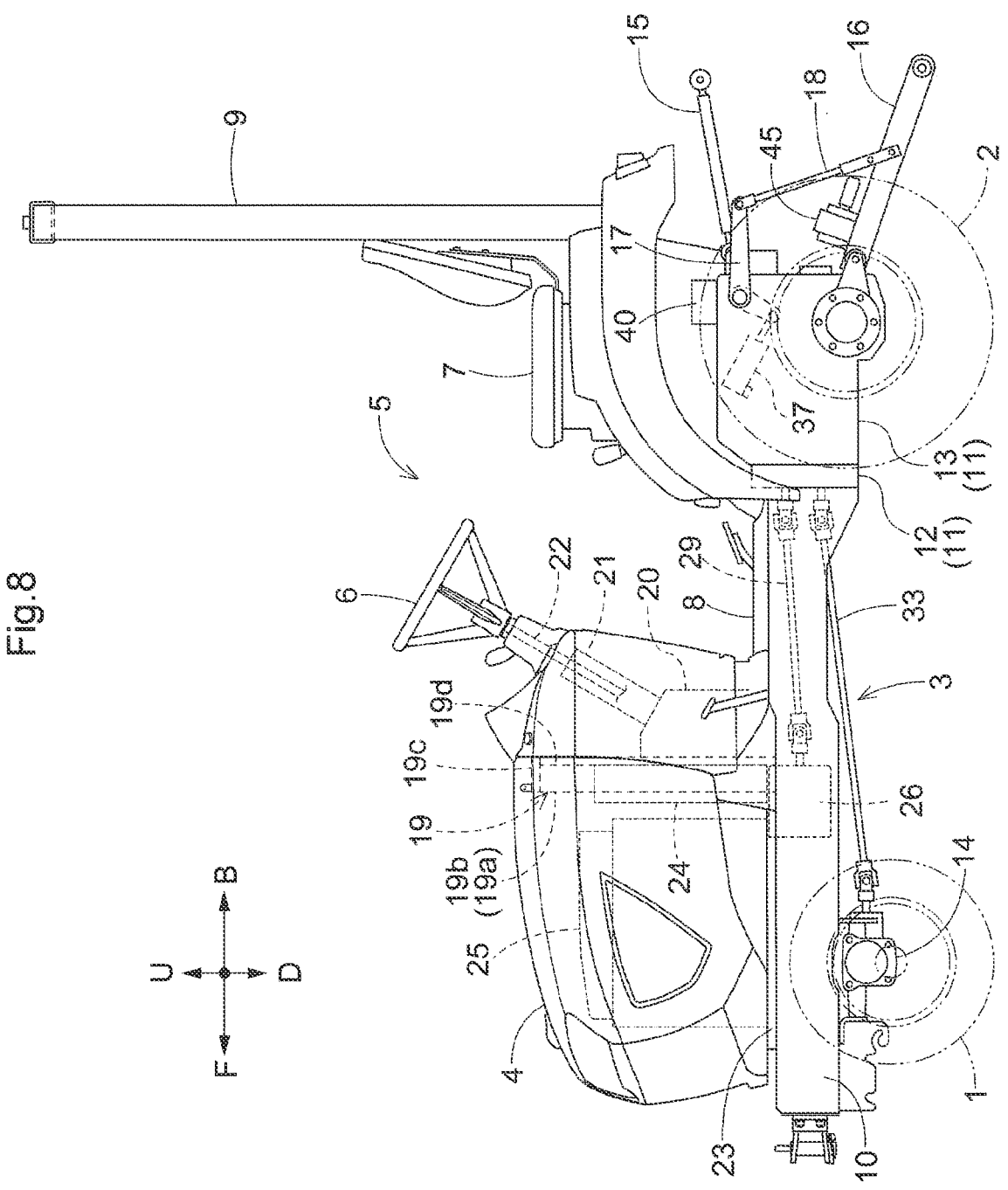
FIG. 8 is a left side view of a tractor according to a seventh variation of implementation of the invention.

A work motor 45 may be provided on the left and right lower links 16 (link mechanism), as shown in FIG. 8.

According to the configuration shown in FIG. 8, with the work device joined to the top link 15 and the lower links 16, a transmission shaft (not shown) is connected to the work motor 45 and the work device. The inverter 24 converts DC power from the battery 25 to AC power, which is supplied to the work motor 45 to operate the work motor 45, and motive power from the work motor 45 is transmitted to the work device.

In the configuration shown in FIG. 8, the PTO transmission 35 and the PTO shaft 36 shown in FIGS. 1 and 3 may be eliminated. The work motor 45 may be provided on the top link 15 (link mechanism)

Eighth Variation of Implementation of the Invention

The tractor may have a four-wheel steering structure in which the front wheels 1 and the rear wheels 2 are steered in the same and opposite phases by the steering wheel 6.

Crawler-type travel devices (not shown) may be provided instead of the front wheels 1 as the front travel devices. Crawler-type travel devices (not shown) may be provided instead of the rear wheels 2 as the rear travel devices. One crawler-type travel device (not shown) may be provided instead of the front wheels 1 and the rear wheels 2.

INDUSTRIAL APPLICABILITY

The present invention can be applied to not only electric tractors in which a motor drives a travel device, but also to hybrid tractors in which an engine and a motor drive a travel device, and can be applied to not only tractors but also construction work vehicles and agricultural work vehicles.

What is claimed is:

1. A work vehicle comprising:
a travel device;
a battery;
a motor configured to supply motive power to the travel device;
an inverter configured to operate the motor;
an operation section;
a hood; and
a pillar frame having a left section extending in the up-down direction, a right section extending in the up-down direction, and an upper section extending between an upper portion of the left section and an upper portion of the right section,
wherein the battery is forward of the operation section,
wherein the inverter is between the battery and the operation section in a side view,
wherein the inverter extends in an up-down direction in a side view and extends in a left-right direction that intersects with a direction along which the work vehicle moves forward in a plan view,
wherein the pillar frame is between the battery and the operation section in a side view,
wherein the pillar frame supports the hood, and
wherein the inverter is between the left section and the right section and below the upper section in a front view, and the inverter is in a region surrounded by the pillar frame.

2. The work vehicle according to claim 1, further comprising:
a steering wheel configured to operate the travel device and located at a front portion of the operation section; and

12 a steering shaft configured to operate the travel device and extending downward from the steering wheel, and
wherein the inverter is between the battery and the steering shaft in a side view.

3. The work vehicle according to claim 1,
wherein the motor is below the inverter.

4. A work vehicle comprising:
a work device;
a travel device;
a battery;
a motor configured to supply motive power to the travel device;
an inverter configured to operate the motor;
a transmission case housing a transmission for travel;
an operation section;
an operator seat included in the operation section;
a link mechanism disposed on the transmission case, configured to be raised and lowered, and joined to the work device;
a hydraulic cylinder disposed on the transmission case and configured to raise and lower the link mechanism;
a hydraulic pump configured to supply hydraulic oil to the hydraulic cylinder; and
a pump motor configured to drive the hydraulic pump, and
wherein:
the motor, the transmission, and the travel device are configured such that motive power from the motor is transmitted to the transmission and transmitted from the transmission to the travel device,
the battery is forward of the operation section,
the inverter is between the battery and the operation section in a side view,
the transmission case is below the operator seat, and
the pump motor is between the operator seat and the transmission case in a side view.

* * * * *